(12) United States Patent
Mutoh

(10) Patent No.: US 7,711,481 B2
(45) Date of Patent: May 4, 2010

(54) NAVIGATION SYSTEM

(75) Inventor: Katsuhiko Mutoh, Toyota (JP)

(73) Assignee: DENSO CORPORATION, Kariya (JP)

( * ) Notice: Subject to any disclaimer, the term of this patent is extended or adjusted under 35 U.S.C. 154(b) by 414 days.

(21) Appl. No.: 11/797,385

(22) Filed: May 3, 2007

(65) Prior Publication Data

US 2007/0276593 A1 Nov. 29, 2007

(30) Foreign Application Priority Data

May 26, 2006 (JP) ............................. 2006-146784

(51) Int. Cl.
*G01C 21/00* (2006.01)
(52) U.S. Cl. ........................................ 701/213; 368/28
(58) Field of Classification Search ................... 701/213
See application file for complete search history.

(56) References Cited

U.S. PATENT DOCUMENTS

| | | | | |
|---|---|---|---|---|
| 4,789,985 | A * | 12/1988 | Akahoshi et al. ............... | 714/3 |
| 5,757,786 | A | 5/1998 | Joo | |
| 5,923,618 | A * | 7/1999 | Nelson et al. .................. | 368/28 |
| 2006/0276202 | A1* | 12/2006 | Moeglein et al. .......... | 455/456.1 |
| 2007/0205942 | A1* | 9/2007 | Xie et al. ................ | 342/357.13 |
| 2007/0230285 | A1* | 10/2007 | Nakagawa .................... | 368/47 |
| 2007/0241959 | A1* | 10/2007 | Nakagawa ............. | 342/357.06 |
| 2007/0288748 | A1* | 12/2007 | Kakiuchi et al. ............ | 713/159 |
| 2007/0294030 | A1* | 12/2007 | Jones .......................... | 701/209 |
| 2008/0046151 | A1* | 2/2008 | Ziehr ........................ | 701/49 |
| 2009/0002231 | A1* | 1/2009 | Xie et al. ............... | 342/357.13 |
| 2009/0015470 | A1* | 1/2009 | Fujisawa ............... | 342/357.13 |
| 2009/0034372 | A1* | 2/2009 | Fujisawa ..................... | 368/14 |
| 2009/0115660 | A1* | 5/2009 | Garin et al. ............ | 342/357.15 |
| 2009/0129206 | A1* | 5/2009 | Baba ........................... | 368/14 |
| 2009/0135674 | A1* | 5/2009 | Matsuzaki ................... | 368/14 |
| 2009/0150072 | A1* | 6/2009 | Yokoi ......................... | 701/209 |
| 2009/0180356 | A1* | 7/2009 | Fujisawa ..................... | 368/47 |

FOREIGN PATENT DOCUMENTS

| | | |
|---|---|---|
| JP | A-06-308262 | 11/1994 |
| JP | A-2000-352583 | 12/2000 |
| JP | A-2002-90441 | 3/2002 |

OTHER PUBLICATIONS

Robertson, Martin, "GPS Rollover testing", Apr. 22, 1998; https://listserv.unb.ca/cgi-bin/wa?A2=ind9804&L=canspace&F=P&P=36984.*
Motorola, Oncore User's Guide, Jun. 1998, Chapter 3; http://www.wa5rrn.com/Oncore%20GPS/ch3.pdf; p. 3.41.*
Dana, Peter, "GPS Week Number Rollover Issues", Aug. 12, 24, 1999; http://www.colorado.edu/geography/gcraft/notes/gps/gpseow.htm.*
Fall '98 Newsletter, http://www.hydrography.ca/newsletter/1998/fall98.html.*

* cited by examiner

*Primary Examiner*—Khoi Tran
*Assistant Examiner*—Brian J Broadhead
(74) *Attorney, Agent, or Firm*—Posz Law Group, PLC

(57) ABSTRACT

A navigation system for use in a vehicle receives a GPS signal for having a GPS time data that rolls over at an interval of 19.7 years with a start time of 0 a.m. Jan. 6th, 1980 from a GPS satellite, and acquires map generation date information that specifies map data generation time from map database in the navigation system. The GPS time data and the map data generation time information are utilized for calculating an accurate current date and time.

6 Claims, 5 Drawing Sheets

NAVIGATION SYSTEM

CROSS REFERENCE TO RELATED APPLICATION

This application is based on and claims the benefit of priority of Japanese Patent Application No. 2006-146784 filed on May 26, 2006, the disclosure of which is incorporated herein by reference.

FIELD OF THE INVENTION

The present invention generally relates to a vehicular navigation system.

BACKGROUND INFORMATION

In recent years, various techniques for calculating a correct current time and date are disclosed based on GPS signals from GPS satellites for use in a navigation system.

GPS system currently in use worldwide adopts a time series that started at a reference time of 00:00:00 (a.m.) on Sunday, Jan. 6th, 1980. In this time series, the length of 1 second is the one defined in Coordinated Universal Time (UTC). The GPS signals from the GPS satellites include an elapsed time from the reference time, that is, so-called GPS time data for time measurement.

The GPS time data is made up from WN data that represents the number of weeks from the reference time and the number of elapsed seconds from 0 a.m. Sunday of the week specified by the WN data. The WN data is represented by using 10 bits of data, that is, a total of 1024 weeks from 0th week to 1023rd week. Then, the WN data "rolls over" to return to 0th week for measurement.

Therefore, the GPS time data in the above-described format is only capable of representing the time series from 0 a.m. of the 0th week of Sunday, Jan. 6th, 1980 to 11 p.m. 59 min. 59 sec. of the 1023rd week of Saturday, Aug. 21, 1999, and no further date and time.

However, the time series in the GPS time data is as accurate as the time series in UTC except for the portion of the Christian Era (the portion of years), thereby providing an accurate time measurement when the Christian Era year is corrected for the use in the navigation system.

For example, Japanese patent document JP-A-2002-90441 discloses a technique that the Christian Era year in the GPS time data is corrected based on a correct time information derived from a reference radio wave.

However, the technique in the above document uses a dedicated communication device for receiving the reference radio wave, thereby demanding an increased room in the navigation system. Further, the technique in the above document does not work properly when the reference radio wave is not available.

SUMMARY OF THE INVENTION

In view of the above and other problems, the present invention provides a navigation system that securely calculates correct date and time in a vehicle navigation system without increasing a volume of the system.

In the present disclosure, the navigation system for use in a vehicle includes a GPS signal reception unit that receives a GPS signal from a GPS satellite, a date calculation unit that calculates date and time based on GPS time information in the GPS signal that is received by the GPS signal reception unit, a map database that stores map information in association with a map generation date information that specifies when the map information is generated, and an information acquisition unit that acquires the map generation date information from the map database and provides the map generation date information for the date calculation unit. The GPS signal at least includes date and time information that defines GPS time information based on a certain reference point of time, and the date calculation unit calculates a current date and time based on the GPS time information derived from the GPS signal as well as the date and time information provided by the information acquisition unit.

The navigation system of the present disclosure calculates a correct current time based on the time information derived from the map database already provided in the navigation system, thereby providing an advantage of security in date and time calculation without adding a device to the original navigation system. Further, acquisition of the date and time information is facilitated as a result of devising the primary function of date and time calculation.

BRIEF DESCRIPTION OF THE DRAWINGS

Other objects, features and advantages of the present invention will become more apparent from the following detailed description made with reference to the accompanying drawings, in which.

DETAILED DESCRIPTION

Embodiments of the present disclosure are described with reference to the accompanying the drawings.

Figure 1:
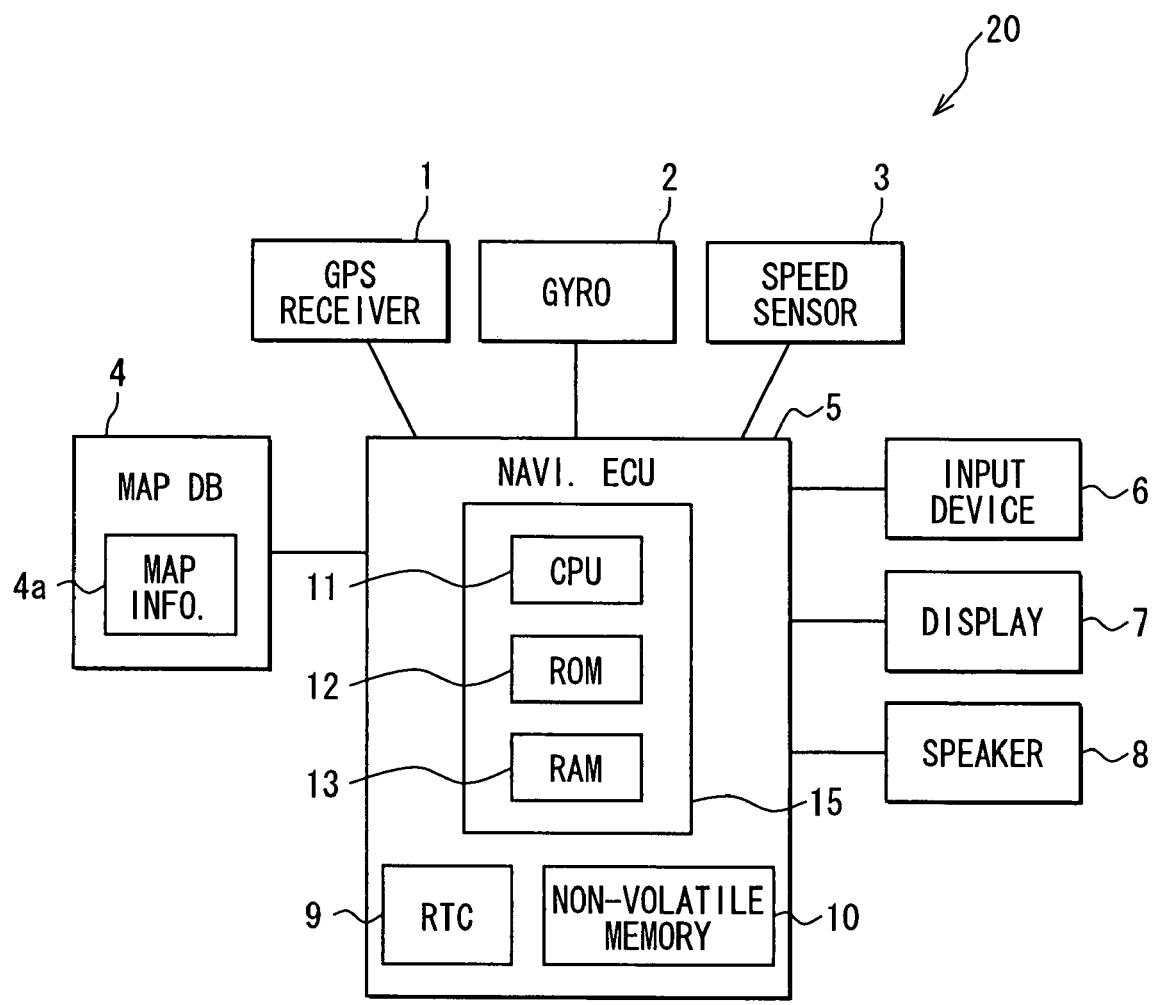
FIG. 1 shows a block diagram of a navigation system in a first embodiment of the present disclosure.

FIG. 1 shows a block diagram of a navigation system 20 in a first embodiment of the present disclosure.

The navigation system 20 is disposed in a vehicle (not shown in the figure) for detecting a current position of the vehicle and providing a travel navigation for a driver of the vehicle based on a GPS signal from a GPS satellite in an orbit around the earth.

More practically, the navigation system 20 includes a GPS receiver 1 for receiving the GPS signal, a gyroscope 2 for detecting an attitude of the vehicle, a speed sensor 3 for detecting a vehicle speed, a map database (DB) 4 for storing map information 4a, an input device 6 for inputting various information, a display 7 for displaying a map and the like based on the map information 4a, a speaker 8 for outputting a sound, and a navigation electric control unit (ECU) 5 for controlling each part of the navigation system 20.

The map DB 4 is a database where the map data is stored on a memory medium such as a DVD-ROM, a hard disk driver (HDD), or the like. The navigation system 20 includes, though not shown in the figure, a retrieval device for retrieving information recorded on the DVD-ROM and the hard disk driver. The map information 4a in the map DB 4 can be updated on demand.

The navigation ECU 5 includes a well-known type microcomputer 15 having a CPU 11, a ROM 12, and a RAM 13, a real time clock (RTC) 9 for clocking time, and a non-volatile memory 10.

The real time clock (RTC) 9 is operated by a power supply from a backup battery that is not shown in the figure. The RTC is operated even when the navigation ECU 5 is turned off. The RTC 9 has a flag function that is set and reset according to an operation condition. That is, a flag is set when the backup battery provides the power supply for the ECU 5 (i.e., when the RTC 9 operates normally), and the flag is reset when the power supply from the backup battery is stopped (i.e., when the operation of the RTC is not normal). The flag is designated as a current condition flag hereinafter. The time data that is clocked by the RTC 9 may be coded, for example, in a binary coded decimal (BCD) system.

Figure 2:
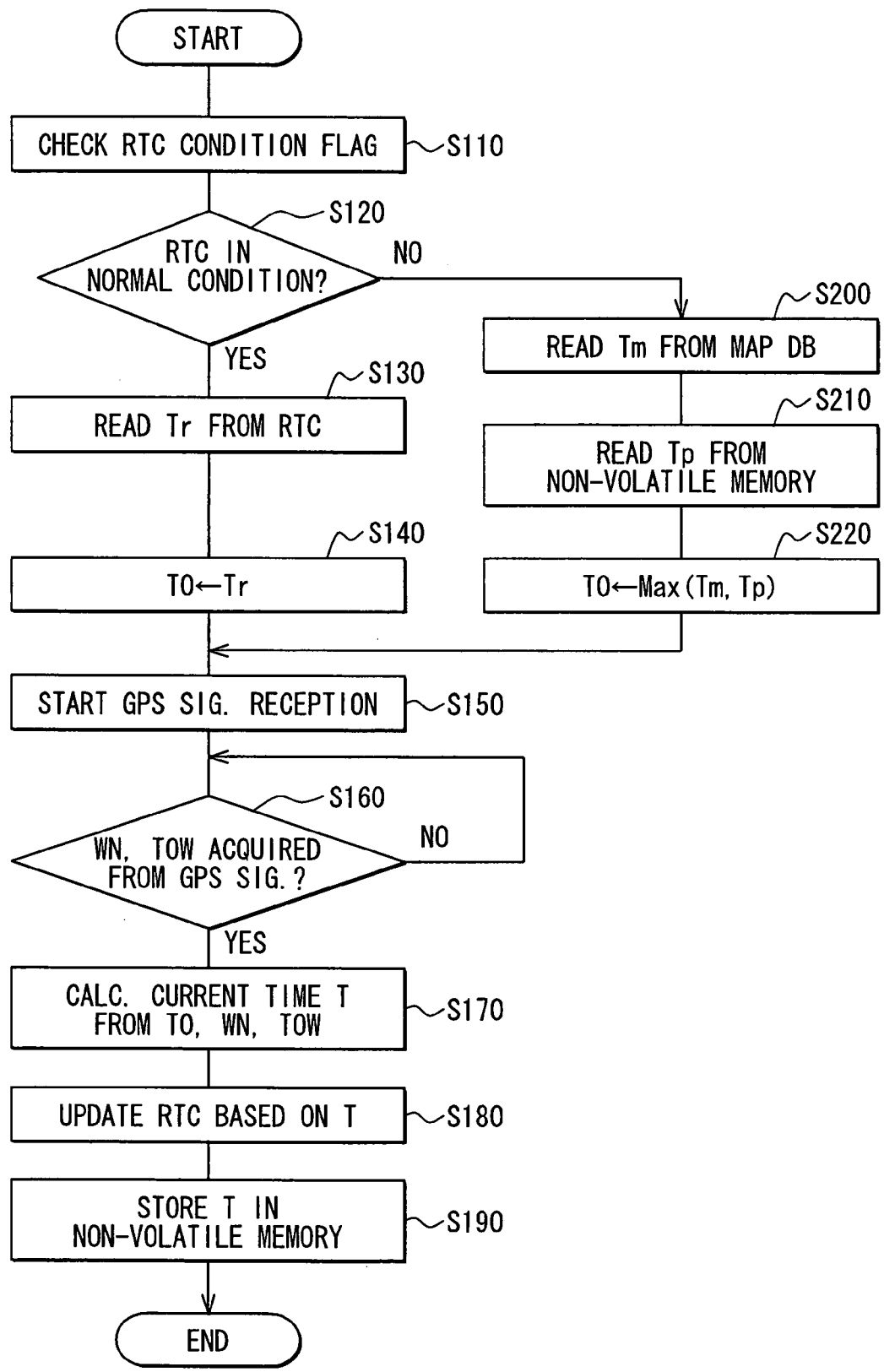
FIG. 2 shows a flowchart of a date and time calculation process in the first embodiment of the present disclosure.

FIG. 2 shows a flowchart of an accurate current date and time calculation process by the microcomputer 15 based on GPS time data in the GPS signal in the first embodiment of the present disclosure. The GPS time data represents a time system in the GPS system, that is, the data of a time system that has started at 0 a.m., Jan. 6th, 1980. The start time of the GPS time is referred to as a reference time hereinafter.

The GPS time data includes WN data that represents the number of weeks clocked from the reference time and TOW data that represents the number of seconds elapsed from 0 a.m. of the Sunday morning of the week represented by the WN data. Both of the WN data and the TOW data are binary data, and the WN data uses 10 bits of binary data. Therefore, the WN data is capable of representing 1024 weeks from the 0th week to 1023rd week, and the TOW data is used to represent an elapsed second number from a start of the week being represented by the WN data.

The process starts with step S110 for checking the current condition flag of the RTC 9. That is, a normal operation of the RTC 9 for clocking the time is examined.

Then, in step S120, the process determines whether the time data is normally retained in the RTC 9. When the condition of the RTC 9 is normal (step S120:YES), the process proceeds to step S130.

In step S130, the process reads time data Tr from the RTC 9. The RTC time data Tr represents a current year, a current month, a current date, a current time, a current minute, and a current second of the time.

Then, in step S140, the process stores the Tr in a predetermined memory area such as a memory area in the RAM 12 as a calculation time data T0 that is used for a calculation of a correct current time. The calculation of the correct current time utilizes both of the GPS time data and the RTC time data Tr. The calculation is described later in step S170.

Then, in step S150, the process starts a reception operation of the GPS signal. In this case, the current time can be calculated based on the RTC time data Tr. Therefore, the current time based on the RTC time data Tr and the like is utilized for estimating a position of the GPS satellite, and the estimated position of the GPS satellite in association with the speed of the vehicle derived from the speed sensor 3 and the attitude of the vehicle detected by the gyroscope 2 is used for estimation of reception frequency of the GPS signal that is under an influence of Doppler effect. In this manner, the GPS receiver is promptly configured for the reception operation of the GPS signal.

On the other hand, when the current time is not available, the position of the GPS satellite and the reception frequency are estimated by a predetermined procedure.

Then, in step S160, the process determines whether the GPS time data is derived from the received GPS signal. That is, an acquisition of the WN data and the TOW data is determined.

When the WN/TOW data are not acquired (step S160:NO), the process repeats step S160. When the WN/TOW data are acquired (step S160:YES), the process proceeds to step S170.

In step S170, the process calculates the correct current time based on the time data T0, and WN/TOW data acquired in step S160. The calculation of the correct current time is described in the following.

First, an elapsed week number W0 that represents the number of weeks between the reference time and the time data T0 is calculated from the time data T0. Then, a week number W that is represented by the WN data is added to a multiple of the roll over week number of 1024. The addition of the week number W to the multiple of 1024 is stopped when the result of the addition exceeds the elapsed week number W0 derived from the time data T0. The result of the addition is saved as the elapsed week number from the reference time.

That is, in other words, k is incrementally increased 1 by 1 from a value of 0 in an inequality $W0 \leq W+1024k$, and the value of k that fulfills the inequality is acquired as the elapsed week number from the reference time to the current date.

The calculation of the elapsed week number can be examined by substituting certain values for the variable k. Assume that the time data T0 represents a date of December 1st (Monday) in a year of 2008. In this case, because the time data T0 is derived from the RTC 9 in step S170 that is subsequent to step S140, the date of December 1st (Monday) in the year of 2008 represents the current date. The date of December 1st (Monday) in the year of 2008 represented by the time data T0 is the second day of the 1508th week from the reference time of January 6th (Sunday) in the year of 1980.

The current date of Dec. 1, 2008 is represented as 484th week from the reference time after a roll over at the 1023rd week.

The inequality $W0 \leq W+1024k$ is not fulfilled when W takes the value of 484, 1024k takes the value of 0 (k=0) and W0 takes the value of 1508 in the above example. Then, the 1024k takes the value of 1024 when the value of k is equal to 1. That is, both of the right side and the left side of the inequality take the value of 1058, thereby providing a fulfilling condition for the inequality. Therefore, the addition to the value of k is stopped at this point. In this manner, the result of the addition, the value of 1058, is acquired as the elapsed week number from the reference time to the current date.

When the time data T0 represents a past date (e.g., a case that the time data T0 is acquired from the map DB 4 (described later)), the calculation will be carried out in the following manner. That is, when the time data T0 represents June 1st (Thursday) in the year of 2006, the date represented by the data T0 is the 5th day in the 1377th week from the reference time (i.e., Jan. 6, 1980 (Sunday)). The current date is assumed to be December 1 st in the year of 2008 as specified above.

In this case, k is incrementally increased 1 by 1 from the value of 0, the inequality $W0 \leq W+1024k$ fulfilled when k is equal to 1. That is, the inequality is represented as 1377 (W0)$\leq$484(W)+1024*1(k). Therefore, similarly as the first example, the value of 1508 on the right side of the inequality is acquired as the elapsed week number from the reference time to the current date as a result.

Then, after an acquisition of the elapsed week number, an elapsed second number is acquired from the TOW data in the GPS time data. That is, in this manner, the elapsed week number and the elapsed second number are acquired based on the reference time, and thus a correct current date is calculated. The current date calculated in step S170 is designated as a current date data T.

Then, in step S180, the process updates the RTC 9 based on the calculated current date data T. That is, the time data clocked by the RTC 9 is replaced with the current date data T. In this manner, the time clocked by the RTC 9 is corrected for accurate measurement.

Then, in step S190, the process stores the current date data T in the non-volatile memory 10. The current date data T is stored by using a data format of binary decimal, or a data format of the generation time data Tm (yyyy/mm/dd). The process is then concluded.

When the condition of the RTC 9 is not normal based on the current condition flag examined in step S110 (step S120:NO), the process proceeds to step S200.

In step S200, the process reads the generation time data Tm stored in map DB 4. The generation time data Tm represents the generation time of the map information 4a in the map DB 4. The generation time data Tm is generated as a property (i.e., an attribute) of the map information 4a when the map information 4a is generated. The generation time data Tm is stored in the map DB 4 in association with the map information 4a. That is, the generation time data Tm is always stored in the map DB 4. The generation time data is stored in a format of yyyy/mm/dd for representing the year, month and date.

Then, in step S220, the process reads the time data that is stored in the non-volatile memory 10. The time data in the non-volatile memory 10 is the updated current date data T calculated in step S1170. That is, the time data retrieved from the non-volatile memory 10 in step S210 is the data that represents the latest date calculated in the time calculation process. The time data retrieved from the non-volatile memory 10 is designated as a memory time data Tp hereinafter.

Then, in step S220, the process compares the generation time data Tm and the memory time data Tp, and stores the data that represents the latest date in a predetermined memory area. The process proceeds to step S150 after storing the data. The process after step S150 (steps S150 to S190) is carried out as described above.

The advantage of the time calculation process is summarized as follows. That is, a correct and accurate current time is calculated based on the time data T0 and the GPS time data. More practically, the number of the elapsed weeks from the reference time is calculated from the time data T0 and the WN data in the GPS time data, and the number of the elapsed seconds is calculated from the TOW data in the GPS time data. In this manner, a correct current time is accurately calculated based on the reference time.

Further, even when the RTC time data Tr is not available due to an abnormal condition of the RTC 9, the time data T0 is derived from the generation time data Tm. Therefore, the correct current time is accurately calculated. In other words, the correct current time can be securely calculated by only acquiring the generation time data Tm from the map DB 4 without adding a device to the navigation system 20.

Furthermore, the current date data T stored in the non-volatile memory 10 in an always updated manner can also be used as the time data T0. For example, when the data represented by the time data T0 is more than 1024 weeks prior to the current date, the correct current date cannot be calculated. However, when the current date data T being updated in the memory 10 is available, the time data T0 that represents the date older than 1024 weeks from the current date can be replaced with the current date data T, thereby avoiding a problematic situation that the current date being calculated from the time data T0 is more than 1024 weeks older than the correct current date.

Figure 3:
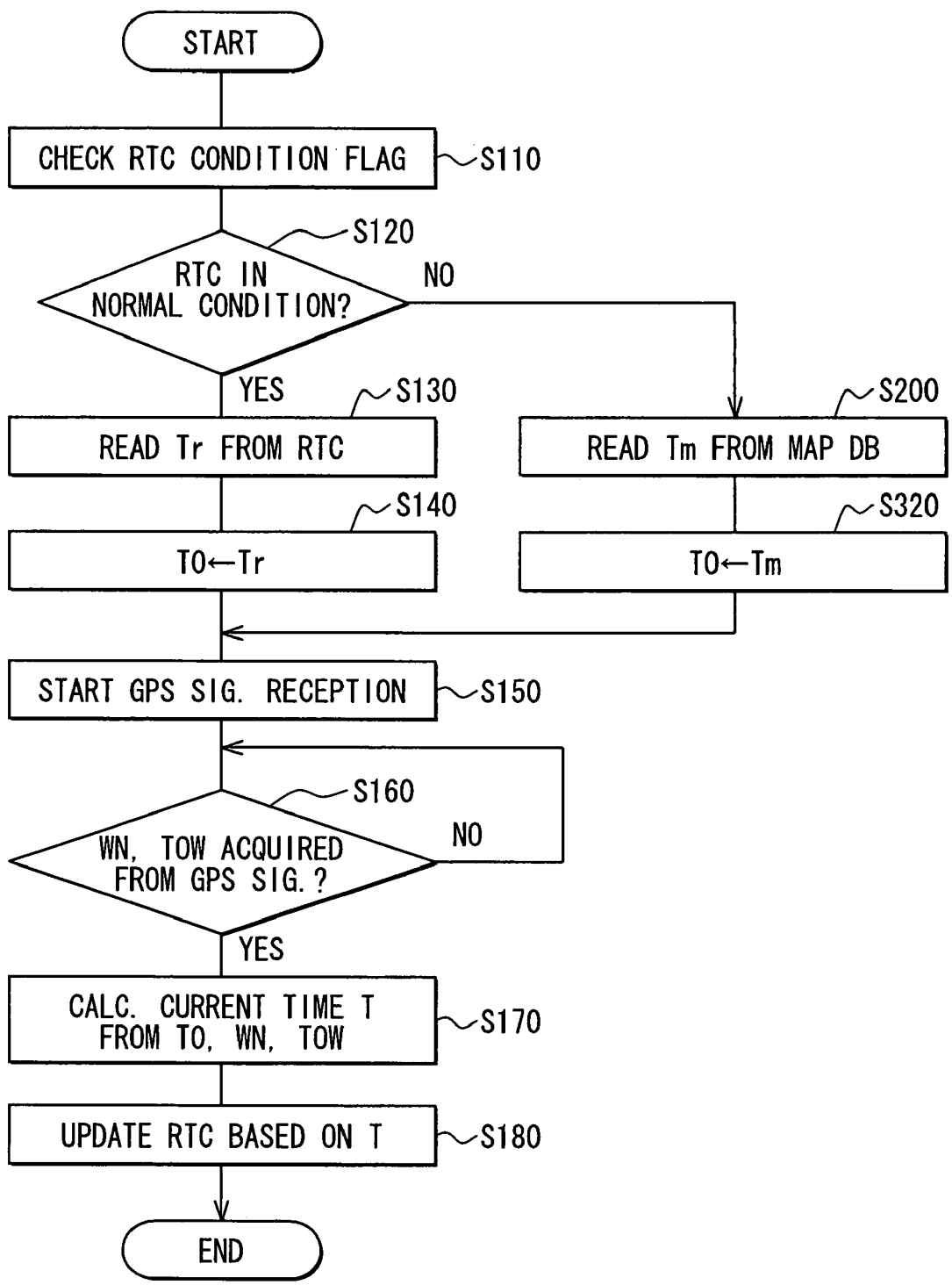
FIG. 3 shows a flowchart of the date and time calculation process in a second embodiment of the present disclosure.

A second embodiment of the present disclosure is described in the following. FIG. 3 shows a flowchart of the date and time calculation process executed by the microcomputer 15 in the second embodiment of the present disclosure. The navigation system 20 in the second embodiment has the same structure as the system 20 in the first embodiment except that the system 20 in the second embodiment lacks the non-volatile memory 10.

The time calculation process in FIG. 3 is different from the calculation process in FIG. 2 in that the calculation process in FIG. 3 lacks steps S210 and S190 that are found in the calculation process in FIG. 2. Further, step S220 in FIG. 2 is replaced with step S320 in FIG. 3 for storing the generation time data Tm retrieved from the map DB 4 in step S200 to a predetermined memory area as the time data T0. Other steps in the calculation process in FIG. 3 is the same as the corresponding steps in FIG. 2. Therefore, the navigation system 20 in the second embodiment has a simpler structure by omitting the non-volatile memory 10 from the structure used in the first embodiment. The advantage that the correct current date is calculated by acquiring the generation time data Tm from the map DB 4 without adding a device to the navigation system 20 is same as the first embodiment.

Figure 4:
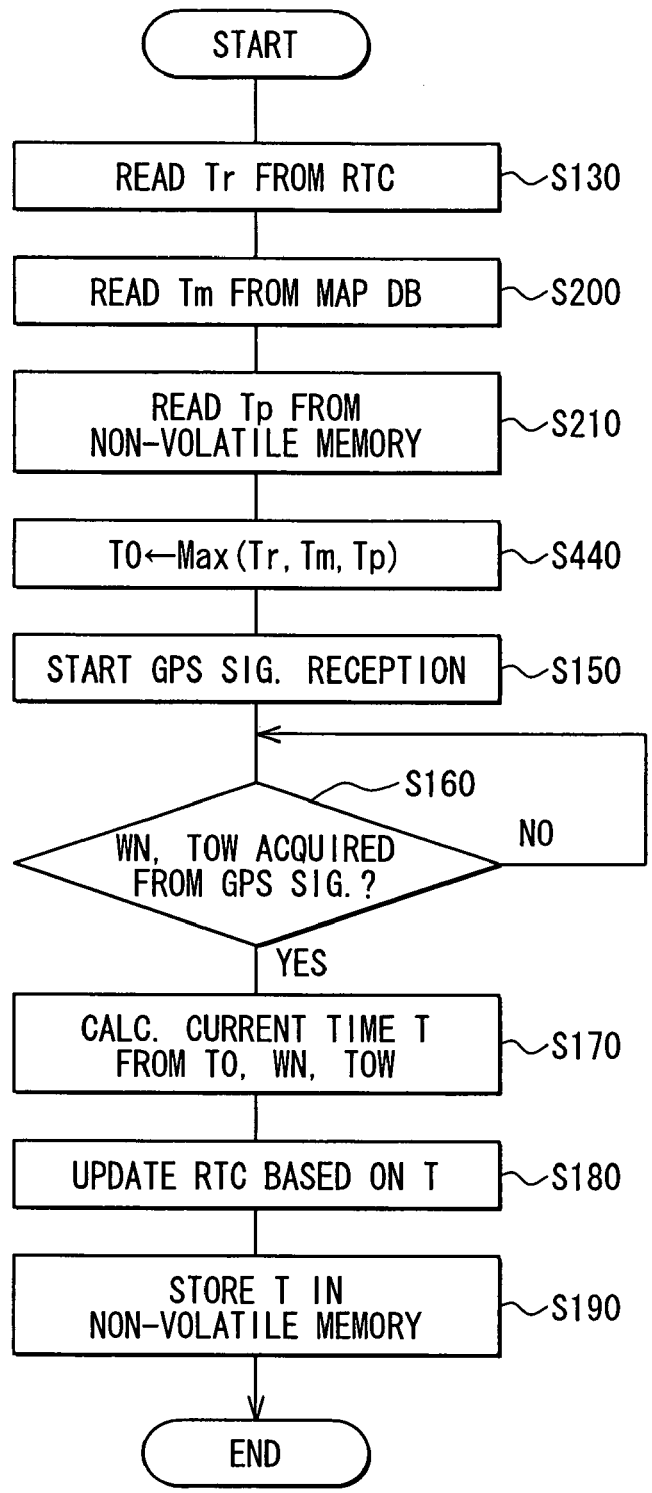
FIG. 4 shows a flowchart of the date and time calculation process in a third embodiment of the present disclosure.

A third embodiment of the present disclosure is described in the following. FIG. 4 shows a flowchart of the date and time calculation process executed by the microcomputer 15 in the third embodiment of the present disclosure. The navigation system 20 in the third embodiment has the same structure as the system 20 in the first embodiment. The RTC 9 in the third embodiment does not have the flag function for setting/resetting the current condition flag. The flag function may or may not be available depending on a type of the RTC 9. However, the navigation system 20 in the third embodiment can calculate the correct current date even when the RTC 9 does not have the flag function.

The time calculation process in FIG. 4 proceeds to step S200 for reading the generation time data Tm of the map information 4a from the map DB 4 with the RTC time data Tr retrieved in step S130. Then, in step S210, the process reads the time data Tp from the non-volatile memory 10. Then, the process proceeds to step S440.

In step S440, the process determines the latest date among the dates represented by the RTC time data Tr, the generation time data Tm, and the memory time data Tp. The process stores the data that represents the latest date as the time data T0 in the predetermined memory area. Then, the process proceeds to step S150 and subsequent steps. The steps having like number has the same procedure as described in the first embodiment.

The third embodiment has the same advantage as the first embodiment by calculating the correct current date from the time data Tm that is updated based on the latest date represented either by the time data Tr, Tm or Tp. As a result, the process avoids a problematic situation that the current date being calculated from the time data T0 is more than 1024 weeks older than the correct current date.

In the third embodiment, the microcomputer 15 may watch an operation condition of the RTC 9. For example, data may be retrieved from the RTC 9 at a certain interval, and the difference between the two successively retrieved data may be compared with the certain interval for examining the operation condition of the RTC 9. When the operation condition is determined to be abnormal, data retrieval from the RTC 9 may be stopped.

Figure 5:
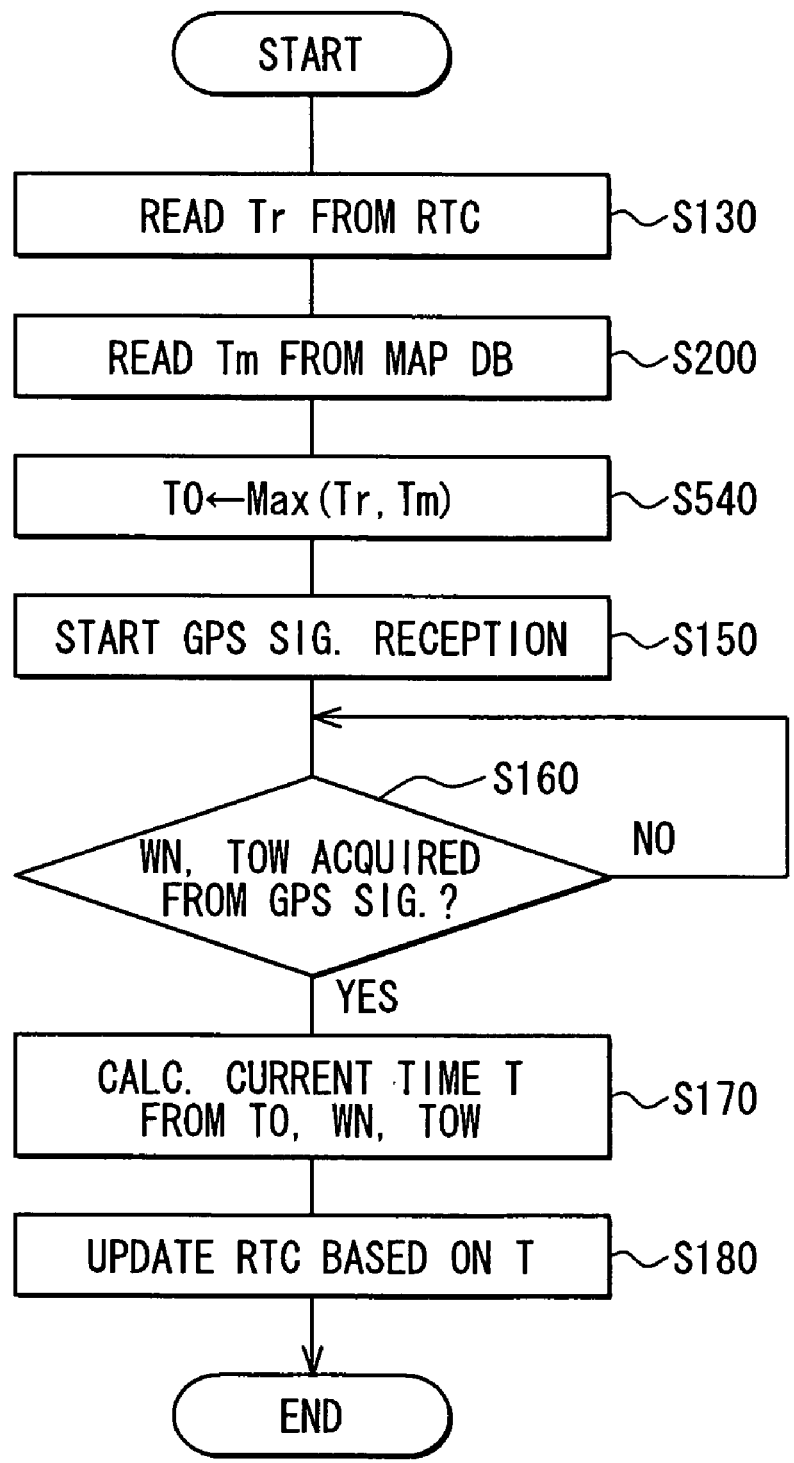
FIG. 5 shows a flowchart of the date and time calculation process in a fourth embodiment of the present disclosure.

A fourth embodiment of the present disclosure is described in the following. FIG. 5 shows a flowchart of the date and time calculation process executed by the microcomputer 15 in the fourth embodiment of the present disclosure. The navigation system 20 in the fourth embodiment has the same structure as the system 20 in the third embodiment except that the system 20 in the fourth embodiment lacks the non-volatile memory 10.

The time calculation process in FIG. 5 is different from the calculation process in FIG. 4 in that the calculation process in FIG. 5 lacks steps S210 and S190 that are found in the calculation process in FIG. 4. Further, step S440 in FIG. 4 is replaced with step S540 in FIG. 5 for storing the latest date represented either by the RTC time data Tr retrieved in step S130 or by the generation time data Tm retrieved from the map DB 4 in step S200 to a predetermined memory area as the time data T0. Other steps in the calculation process in FIG. 5 is the same as the corresponding steps in FIG. 4.

The navigation system 20 in the fourth embodiment has a simpler structure by omitting the non-volatile memory 10 from the structure used in the third embodiment. The advantage that the correct current date is calculated by acquiring the generation time data Tm from the map DB 4 without adding a device to the navigation system 20 is same as the first embodiment.

Further, the process avoids a problematic situation that the current date being calculated from the time data T0 is more than 1024 weeks older than the correct current date by utilizing the data Tr or data Tm that represents the latest date as the calculation time data T0.

In the fourth embodiment, the microcomputer 15 may watch an operation condition of the RTC 9. For example, data may be retrieved from the RTC 9 at a certain interval, and the difference between the two successively retrieved data may be compared with the certain interval for examining the operation condition of the RTC 9. When the operation condition is determined to be abnormal, data retrieval from the RTC 9 may be stopped.

Although the present invention has been fully described in connection with the preferred embodiment thereof with reference to the accompanying drawings, it is to be noted that various changes and modifications will become apparent to those skilled in the art.

For example, the map DB 4 may be updated through a network. The network may be a wired network or may be a wireless network. The navigation system 20 that communicates through the network may be provided with a communication unit.

The method for calculating the correct current date based on the time data T0 and the GPS time data may be arbitrarily chosen. That is, for example, the Christian Era portion may be derived from the time data T0, and the elapsed second portion may be derived from the GPS time data. Assuming that the current date and time is Dec. 1, 2008, 0 p.m., the time data T0 is Oct. 1, 2008, and the GPS time data is Dec. 1, 1990, 0 p.m., the Christian Era portion 2008 may be derived from the time data T0, and December 1, 0 p.m. portion may be derived from the GPS time data.

Such changes and modifications are to be understood as being within the scope of the present invention as defined by the appended claims.

What is claimed is:

1. A navigation system for use in a vehicle comprising:
   a GPS signal reception unit that receives a GPS signal from a GPS satellite, wherein the GPS signal at least includes date and time information that defines GPS time information based on a certain reference point of time;
   a date calculation unit that calculates date and time based on the GPS time information in the GPS signal that is received by the GPS signal reception unit;
   a map database that stores map information in association with a map generation date information that specifies when the map information is generated from an on-demand-update;
   an information acquisition unit that acquires the map generation date information from the map database and provides the map generation date information for the date calculation unit; and
   a storage unit that updates and stores information on a current date and time calculated by the date calculation unit,
   wherein the date calculation unit calculates the current date and time based on the GPS time information derived from the GPS signal as well as the date and time information provided by the information acquisition unit,
   wherein, when the information on the current date and time is stored in the storage unit, the information acquisition unit acquires the information on the current date and time in the storage unit and provides the information on the current date and time for the date calculation unit instead of providing the map generation date information,
   wherein the information acquisition unit acquires both of the map generation date information and the information on the current date and time stored in the storage unit, and
   the information acquisition unit provides, for the date calculation unit, information that specifies the latest date and time among the information acquired by the information acquisition unit.

2. The navigation system as in claim 1 further comprising:
   an internal clock that clocks date and time,
   wherein the information acquisition unit acquires information on date and time clocked by the internal clock from the internal clock, the map generation date information and the information on the current date and time stored in the storage unit, and
   the information acquisition unit provides for the date calculation unit information that specifies the latest date and time among the information acquired by the information acquisition unit.

3. The navigation system as in claim 1 further comprising:
   an internal clock that clocks date and time,
   wherein the information acquisition unit acquires information on date and time clocked by the internal clock from the internal clock and the map generation date information, and
   the information acquisition unit provides for the date calculation unit information that specifies the latest date and time among the information acquired by the information acquisition unit.

4. The navigation system as in claim 2 further comprising:
   a clock abnormality detection unit that detects an abnormality of the internal clock; and
   an information acquisition prohibition unit that prohibits an acquisition of information by the information acquisition unit from the internal clock upon detection of the abnormality of the internal clock by the clock abnormality detection unit.

5. The navigation system as in claim 4, wherein the abnormality is detected from a flag that is set when the internal clock operates normally and is reset when power supply to the internal clock is stopped.

6. The navigation system as in claim 4, wherein the abnormality is detected from the date and time retrieved at a time interval from the internal clock that abnormally compares to the time interval for retrieval.

* * * * *